May 25, 1937. A. E. HUGHES 2,081,669

FILLING MACHINE

Filed May 4, 1934 2 Sheets-Sheet 1

INVENTOR
Author E. Hughes
BY
ATTORNEY

May 25, 1937.  A. E. HUGHES  2,081,669
FILLING MACHINE
Filed May 4, 1934  2 Sheets-Sheet 2

INVENTOR
Arthur E. Hughes
BY
ATTORNEY

Patented May 25, 1937

2,081,669

UNITED STATES PATENT OFFICE 2,081,669

FILLING MACHINE

Author E. Hughes, Hoopeston, Ill., assignor to Food Machinery Corporation, San Jose, Calif., a corporation of Delaware Application May 4, 1934, Serial No. 723,984

2 Claims. (Cl. 226—96)

This invention relates to improvements to filling machines for filling liquids of various sorts into positioned containers and has particular reference to the filling of materials such as paints, molasses and the like which have a tendency to cling and adhere to the filling mechanism and drip therefrom onto the containers and the machines which in time causes a very mussy and unsanitary condition.

The filling machines to which this improvement is particularly applicable are of the type as disclosed in Patent 1,435,300 which may be referred to for details of construction and operation not shown or described herein.

This type of machine comprises a central hopper adapted to carry a supply of filling material. Arranged around the periphery of the hopper are a series of spaced filling plungers adapted to move up and down in the filling nozzles and to finally eject the last vestige of material therefrom so that the containers will be evenly and uniformly filled.

The final position of the plungers are substantially even with the nozzle opening just above the filled container. The hopper carrying the filling nozzles rotates continuously and the empty containers are moved into filling positions under the nozzles and removed therefrom after filling by suitable mechanism, also continuously.

The heavier and more viscous materials such as paints, molasses and the like will adhere to the ends of the nozzles and plungers after the filled cans have been removed and quite frequently these residual deposits will drip from the nozzles and plungers and fall, either on the filled containers as they pass from thereunder, or on portions of the adjacent machinery and in time the accumulations will be sufficient to make a very messy condition which must be cleaned up at intervals at considerable expense and loss of time and operation.

The improvements forming the subject matter of this application are for the purpose of periodically removing this adhereing dripping material and deposit and convey it away from the operative mechanism of the filler and thus eliminate the muss and expense of cleaning it up.

Briefly the improvements consist of placing either absorbent and flexible wiper elements, or merely flexible wiper elements along the paths of the parts of the mechanism that carries the dripping material, over which the parts will rub and contact and wipe and remove this dripping material and deposit or convey it away from the operative elements and thus continually keep the machine clean and in a sanitary condition.

Wiping contact devices are provided for contacting with the ends of the nozzles and plungers at each revolution of the hopper as well as with the table or turret supporting and carrying the containers during the filling operation.

It is therefore an object of the invention to provide devices for a liquid filling machine that will periodically contact with and wipe surfaces carrying dripping material.

It is also an object of the invention to provide means for receiving the removed material and carry it away from the operative elements of the machine.

It is also an object of the invention to provide flexible wiping devices so that no injury will attend the contact necessary to wipe the dripping material from the elements carrying said material.

It is also an object to provide both flexible and absorbent wiping devices for contacting with the elements carrying the dripping material.

Applicant wishes to point out that there are other objects and advantages than have been enumerated and which will become apparent as the description proceeds, also that the application of the improvements to the particular machine illustrated is not intended to imply that it cannot be applied to other types of machines.

The invention is applicable to any type of filling machine where liquid or other materials are fed through a nozzle into a container and the filling operation cut off at intervals to leave a residue of material adhering to the filling mechanism.

In the drawings accompanying this specification Figure 1 is an elevation partly in section showing two filling nozzles, a container that has just been filled and the wiping devices for removing the adhering material from the ends of the nozzles.

The numeral 1 indicates the hopper of a filling machine which carries a supply of filling material. 2 represents the filling nozzles around the periphery of the hopper 1 and 3 represents the plungers moving up and down in the nozzles 2. 3a is the feed means for placing the empty containers into the machine and aligns them with the filling nozzles. 4 is a rotating table on which the cans rest while being carried through the machine. 5 is a sweep arm that engages the filled cans and sweeps them from the table 4 onto the discharge device 6 which carries them away from the machine.

7 and 8 represent wiping devices located along the path of the nozzles after they leave the place where the filled cans are ejected from the machine.

Figure 1:
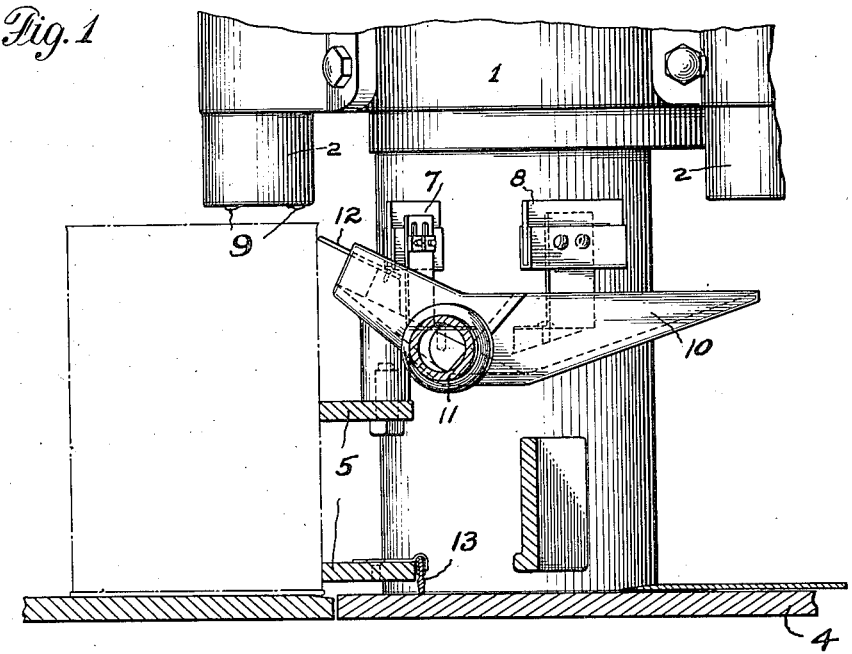
Figure 2:
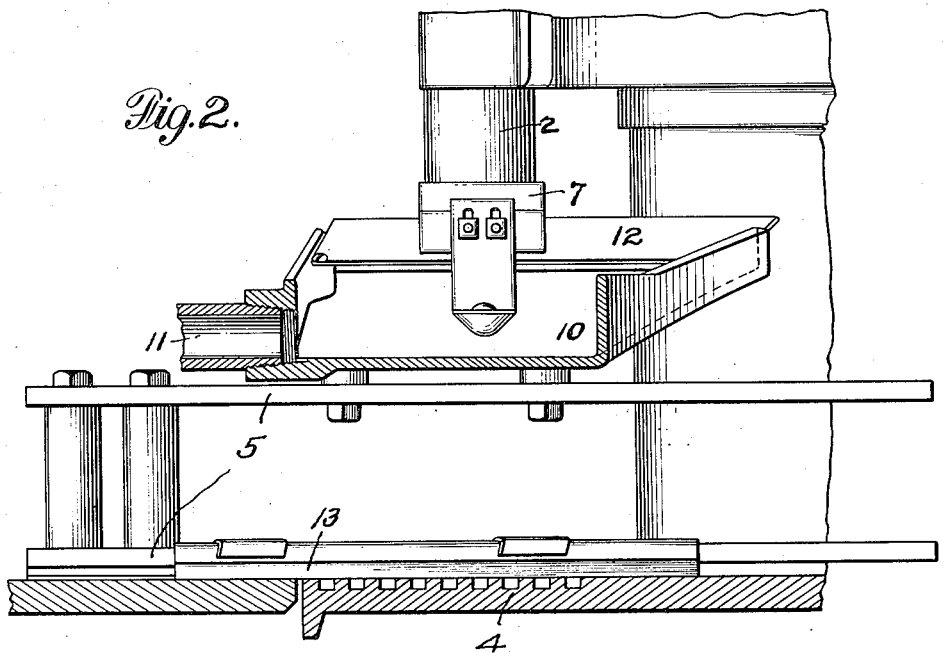
Figure 2 is also an elevation from another angle showing the action of the wiping devices and the receptacle for receiving and conveying away the drip material removed from the mechanism.
Figure 3:
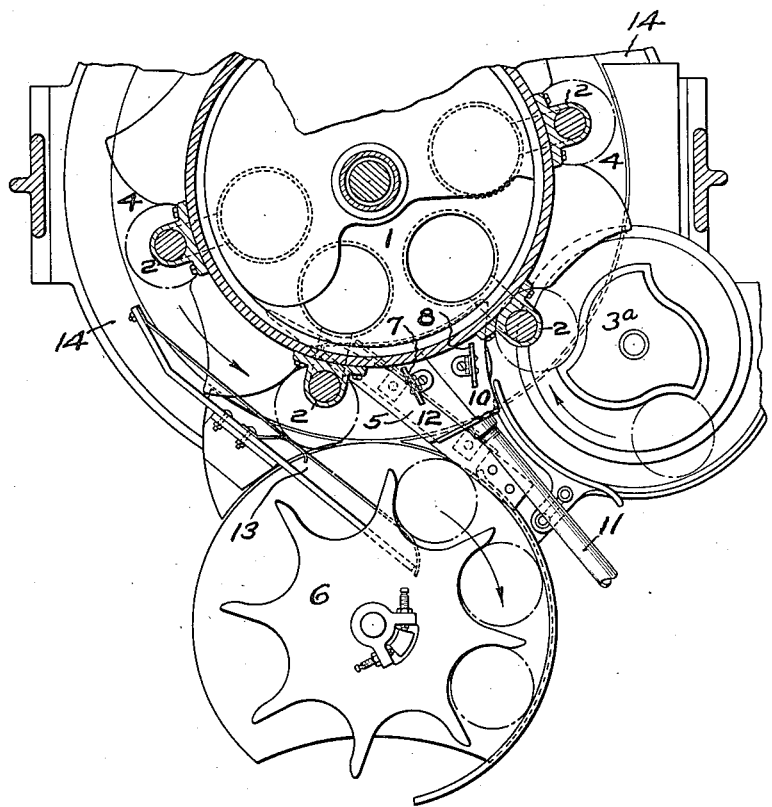
Figure 3 is a general plan of a filling machine showing the wiping devices in their normal positions and also showing the main operative elements of the machine.
Figure 4:
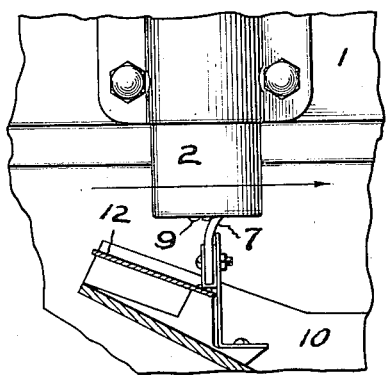
Figure 4 is a detail of one of the wipers showing more clearly its contact with a nozzle carrying dripping material.

9 indicates drops of material adhering to the ends of the nozzles 2 and plungers therein. As the rotation of the hopper 1 carries the nozzles past and over the wipers, the wiper 7 first contacts with the advancing nozzle and wipes the dripping material therefrom as is best shown in Figure 4. The nozzle then passes over the wiper 8 and gets a final wipe that cleans away the last vestige of adhering material.

The wipers 7 and 8 are mounted on standards that are in turn located within a trough 10 which accumulates all of the drip material picked off the nozzles and plungers by the wipers.

A drain pipe 11 leads the accumulated material away into any suitable receptacle or place of disposal.

To obviate the possibility of light liquids dripping from the nozzles immediately the container is moved from under the nozzles a drip plate 12 is provided that follows the line of movement of the cans as they pass from the machine. This drip plate delivers its accumulations into the trough 10.

With some liquid, drip material will reach the table 4 and soil it more or less and to obviate this a wiper 13 is secured to the ejector arm 5 and is adjusted to bear on the top surface of the table 4 and wipe it clean of any adhering material that would tend to soil the bottoms of the oncoming cans. The wiper 13 is set angularly relative to the table 4 and extends slightly out over the outer edge so that the whole surface of the table is covered.

A drip trough 14 is located around the periphery of the table 4 and collects all of the drip from the table and from the wiper 13.

The wipers 7 and 8 are mounted on adjustable brackets so that they may be elevated or lowered to suit operative conditions. The operative conditions may change with a different height can which would necessitate raising or lowering the central column carrying the filling nozzles, or conditions may change through normal wear of the ends of the wipers which would necessitate raising them to compensate for such wear.

What I claim as new and desire to secure by Letters Patent is:

1. In a filling machine for filling mobile materials into positioned containers comprising a rotatable element for successively receiving a series of containers and moving them through a predetermined path, filling means located above said containers and moving in unison therewith while filling material into said containers, nozzle means aligning with said containers for directing material therein, a substantially fixed open top trough located under said rotatable element and extending through a portion of the path of travel of said nozzle means, a non-rotatable fixed wiper mounted in said trough for contacting with said nozzles during their travel and removing adhering material therefrom, a mounting for said wiper and means securing said wiper to said mount permitting vertical adjustment thereof to compensate for normal wear or to maintain proper operative relation with a repositioning of the filling elements.

2. A machine for filling paints, syrups and the like into containers comprising filling nozzles and means for holding containers in operative relation with said nozzles during the filling thereof, an elongated drip accumulating trough beginning closely adjacent the point of separation of the nozzles from the containers and extending over a considerable area of the path of travel of the nozzles to accumulate any drip falling from the nozzles during their travel, wiping members located wholly within the confines of said trough to contact with said nozzles and wipe drip therefrom, and associated means contacting with said container holding means to wipe drip falling thereon from said nozzles.

AUTHOR E. HUGHES.